United States Patent [19]
Buckmann

[11] Patent Number: 5,360,273
[45] Date of Patent: Nov. 1, 1994

[54] HYDROSTATIC ROTOR BEARING HAVING A PIVOTED PAD

[75] Inventor: Paul S. Buckmann, Roseville, Calif.

[73] Assignee: Aerojet General Corporation, Rancho Cordova, Calif.

[21] Appl. No.: 909,870

[22] Filed: Jul. 7, 1992

[51] Int. Cl.$^5$ .............................................. F16C 32/06
[52] U.S. Cl. ..................................... 384/99; 384/117; 384/119
[58] Field of Search ................. 384/99, 117, 119, 118, 384/111, 122

[56] References Cited

U.S. PATENT DOCUMENTS

| | | |
|---|---|---|
| 115,365 | 5/1871 | Shaw . |
| 466,645 | 1/1892 | Wood . |
| 611,984 | 10/1898 | Wright . |
| 1,196,573 | 8/1916 | Michell . |
| 1,268,575 | 6/1918 | Iskols . |
| 1,322,332 | 11/1919 | Bewbigin . |
| 1,331,108 | 2/1920 | Howarth . |
| 1,349,157 | 8/1920 | Kingsbury . |
| 1,414,711 | 5/1922 | Schmidt . |
| 1,421,208 | 6/1922 | Gauldie . |
| 1,436,265 | 11/1922 | Kingsbury . |
| 1,700,856 | 2/1929 | Schein . |
| 2,053,389 | 9/1936 | Asbridge . |
| 2,566,080 | 8/1951 | Davids . |
| 2,873,683 | 2/1959 | Sherwood . |
| 2,972,962 | 2/1961 | Douglas . |
| 2,976,087 | 3/1961 | Cherubim . |
| 3,012,827 | 12/1961 | Goetz . |
| 3,026,150 | 3/1962 | Buckley et al. . |
| 3,093,426 | 6/1963 | Cornford . |
| 3,100,130 | 8/1963 | Deffrenne . |
| 3,101,980 | 8/1963 | Love . |
| 3,119,639 | 1/1964 | Adams . |
| 3,137,531 | 6/1964 | Herrmann et al. . |
| 3,169,807 | 2/1965 | Abel et al. . |
| 3,194,613 | 7/1965 | Pierry et al. . |
| 3,202,465 | 8/1965 | Rushing . |
| 3,249,390 | 5/1966 | Schwartzman . |
| 3,351,394 | 11/1967 | Hooker . |
| 3,359,613 | 12/1967 | Rye . |
| 3,360,309 | 12/1967 | Voorhies . |
| 3,368,850 | 2/1968 | Wilcox . |
| 3,395,949 | 8/1968 | Kun . |
| 3,399,001 | 8/1968 | Whitaker . |
| 3,476,451 | 11/1969 | Schwartzman . |
| 3,502,920 | 3/1970 | Chaboseau . |
| 3,544,120 | 12/1970 | Stamm . |
| 3,586,401 | 6/1971 | Gravelle . |
| 3,604,767 | 9/1971 | Decker . |
| 3,620,581 | 11/1971 | Heller . |
| 3,891,281 | 6/1975 | Jenness . |
| 4,285,551 | 8/1981 | Suzuki . |
| 4,544,285 | 10/1985 | Shapiro et al. .................. 384/99 |
| 4,676,668 | 6/1987 | Ide . |
| 4,927,274 | 5/1990 | Smith . |

OTHER PUBLICATIONS

"Fluid Film Bearings-A Status Reprot", NASA Distribution, Jul. 17, 1990.

*Primary Examiner*—Lenard A. Footland
*Attorney, Agent, or Firm*—Townsend and Townsend

[57] ABSTRACT

A hydrostatic journal bearing system for a rotor or shaft includes bearing pads which are self-aligned and self-adjusting. The self-adjusting aspect includes providing for radial movement of the bearing pads. The self-aligning feature includes providing for pivoting of the bearing pads. In one embodiment a pressurizable piston area provides a radial load to establish a substantially constant clearance between the bearing pad and the rotor. Spring preload of the bearing pads, if provided, prevents relative motion between the bearing and shaft, e.g., during transportation and storage.

27 Claims, 7 Drawing Sheets

$F_R$ —BEARING RADIAL LOAD (lb×10$^{-3}$)
$K_S$ —BEARING RADIAL STIFFNESS (lb/in×10$^{-6}$)
$K_D$ —DYNAMIC STIFFNESS (lb/in×10$^{-7}$)
$Q$ —FLOW RATE (gpm×10$^{-2}$)

HYDROSTATIC ROTOR BEARING HAVING A PIVOTED PAD

The present invention relates to a bearing for supporting a shaft or rotor within a housing and in particular to a rotor-bearing system usable in high speed, high pressure, turbo machinery.

BACKGROUND OF THE INVENTION

In many areas of bearing design, and particularly in the field of high pressure turbo machinery, the design of the rotor-bearing system is of great importance to the performance of the machine. Certain previous designs have provided rolling element bearings. However, at high speeds and high pressures, the load capacities and stiffness limits of rolling element bearings are exceeded and performance and life comprises are made. An example of this situation is the space shuttle main engine (SSME) high pressure fuel pump. In this device, ball-bearings were placed at the outboard ends of the shaft to accommodate bearing speed (DN) limits, which lead to super critical (i.e., operating above critical speed) rotor design. In turn, the super critical rotor design resulted in an unstable rotor which was subject to destructive and unpreventable subsynchronous whirl and to large radial deflections.

Because rolling elements bearings are subject to speed limitations, load capacity limitations, and short life, design of high performance rotating devices such as high pressure turbo pumps has included work on fluid film bearings. Fluid film bearing design has centered around two categories of devices, namely those that rely on the dynamics of the fluid, such as those created from the motion of the rotor, to create the desired bearing film (generally referred to as "hydrodynamic" bearings) and those that provide a flow of fluid, generally pressurized fluid from an external source, to create the bearing, with withdrawal of the provided fluid (referred to as "hydrostatic" bearings) often, with recycling of the withdrawn fluid. Although hydrodynamic bearings are useful in many applications, certain disadvantages are associated with hydrodynamic bearings, particularly in the context of high pressure turbo machinery. In applications where a fluid has a low viscosity (such as cryogenic fluids like liquid hydrogen, liquid oxygen) the pressure generated by hydrodynamic fluid film bearings is very low (typically having values such as 50 P.S.I., 345 kPa).

The present invention is directed to a fluid film hydrostatic bearing, rather than hydrodynamic bearings. Previous hydrostatic bearings have been associated with a number of problems. In previous hydrostatic bearings, particularly those used in connection with low viscosity fluids, designs intended to produce high direct stiffness (e.g., $3 \times 10^6$ lb./in.) have also produced undesirably high cross-coupled stiffness (such as about $3 \times 10^5$ lb./in. or more). Stiffness has particular importance in supercritical devices.

Requirements for bearing performance in connection with subcritical rotor speeds are very different from those used for super critical rotor speeds. Turbo pumps such as those for pumping liquid hydrogen, require high speed, and often super critical rotor speeds to generate the desired pressure. In subcritical designs, the bearing stiffness can be designed very high and can be designed to provide approximately 20% critical speed margin above operating speed. A super critical design, however, typically requires operating between the second and third critical speed and still retaining some margin. As a result, the stiffness requirement has a small range with both a minimum and a maximum bearing stiffness.

Furthermore, the damping characteristics of previous hydrostatic bearings used in connection with low viscosity fluids has been limited. When high pressure turbo machinery used in connection with low viscosity fluids is designed to achieve a small clearances for the hydrostatic bearings, the scale of shaft deflections and tolerances are undesirably large relative to the operating clearances of the bearings. At the high pressures and speeds at which hydrogen turbo pumps operate, deflection of the shaft and housing have a magnitude which is significant relative to the hydrostatic bearing clearances.

SUMMARY OF THE INVENTION

The present invention provides a hydrostatic bearing system which includes a pivoted bearing pad. The bearing design is both self-adjusting, to accommodate radial deflections of the shaft, and self-aligning, to accommodate angular misalignments of the shaft. The result is a bearing which produces high direct stiffness but low cross-coupled stiffness (to help ensure stable rotor motion). In order to meet the stiffness requirement, the clearance must preferably be known, predictable and repeatable. The self-aligning and self-adjusting features allow closer operating clearances which magnify the stiffness and the damping characteristics of the bearing.

In a first embodiment, the bearing is made self-adjusting by mounting at least one bearing pad to permit movement of the pad in a substantially radial direction and is made self-aligning by mounting bearing pads to permit pivoting of the pad. Preferably, the bearing pads can pivot about an infinite number of axes, i.e., can pivot about a point. In one aspect of the first embodiment, radial movement of the pads is controlled by a pressurizable piston region which couples at least one of the pads to the housing. Pressurization of the piston region or regions creates a force on the bearing pad in a radial direction towards the shaft. In addition to the self-adjusting feature, the pad hydraulic piston is used to apply a heavy steady radial preload to the bearing system that permits stable rotor motion. In a second aspect of the first embodiment a non-hydraulic preload is provided (e.g. by a spring force, which may be produced by a wall of the piston region). With the spring preload, radial play is eliminated from the bearing system, preventing relative motion between the bearing and shaft even when the shaft is non-rotating and the piston (if any) is unpressurized (e.g. during transportation and storage).

DESCRIPTION OF THE PREFERRED EMBODIMENTS

Figure 1:
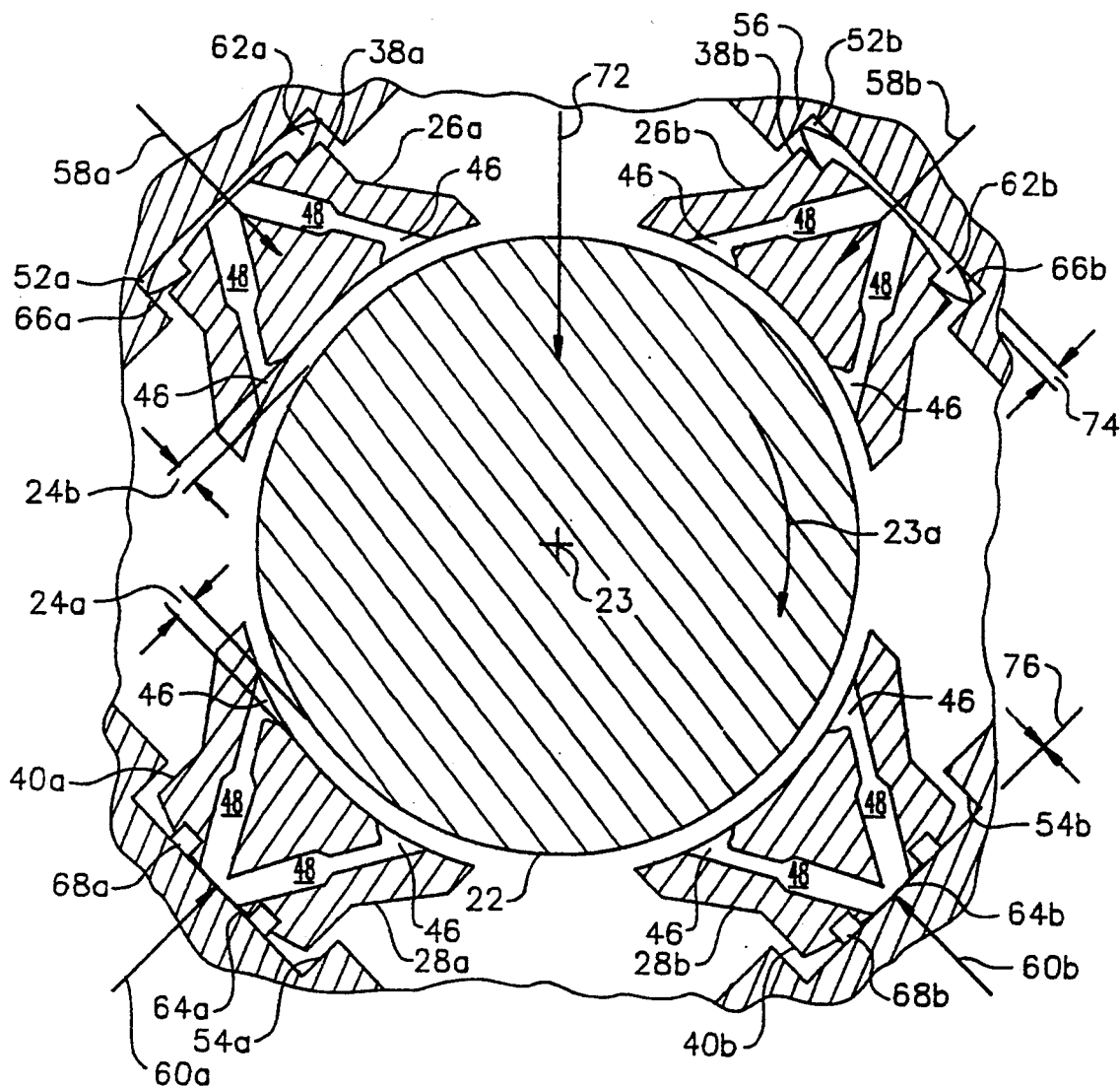
FIG. 1 is a schematic cross sectional view of a rotor-bearing system according to one embodiment of the present invention.

According to a first implementation of the first embodiment of the present invention, a longitudinal shaft or rotor 22 is supported by a liquid film developed in the clearance region 24a, 24b between the surface of the shaft 22 and a number of bearing pads 26a, 26b, 28a, 28b, as depicted in FIG. 1. FIG. 1 is exaggerated in the radial dimension for the sake of clarity. The shaft 22 rotates about longitudinal axis 23. The bearing pads 26a, 26b, 28a, 28b are preferably arranged around diametral plane of the shaft 22.

Figure 2:
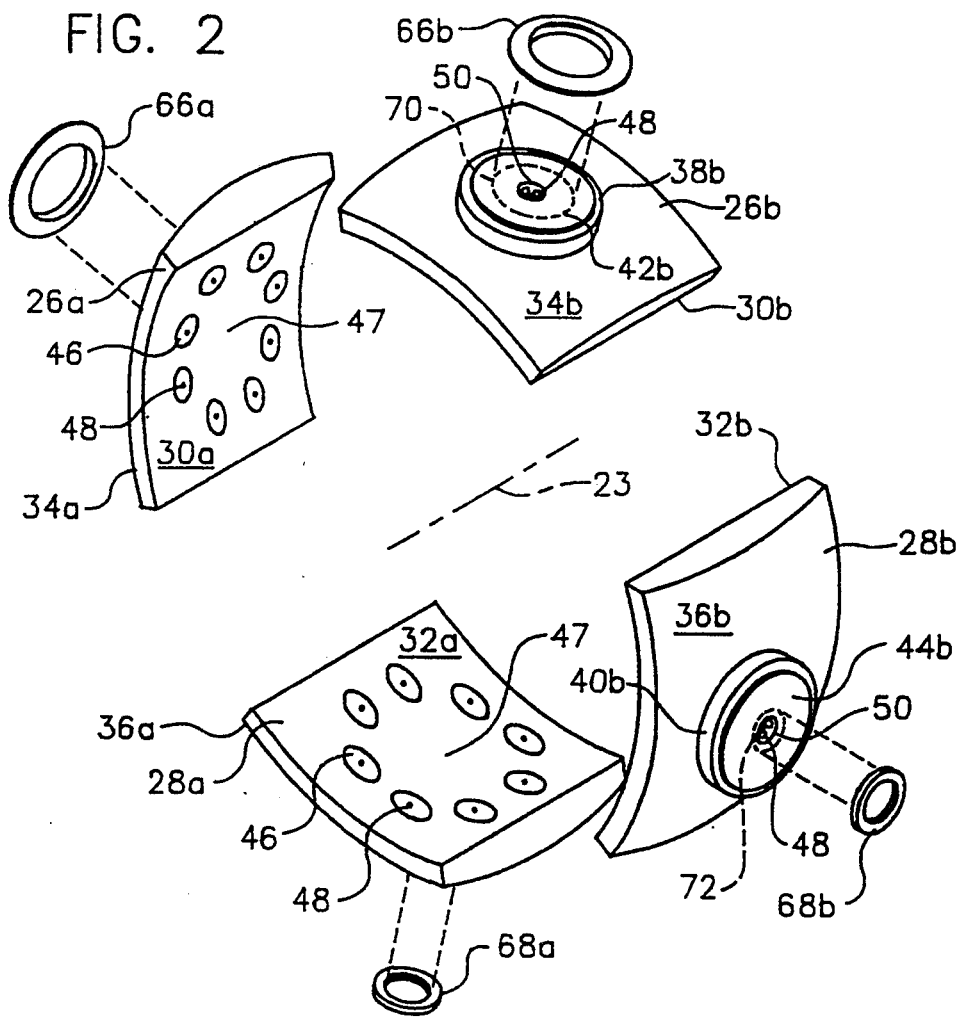
FIG. 2 is a perspective view of four bearing pads in their spaced diametral position.

As depicted in FIG. 2, each of the pads 26a, 26b, 28a, 28b includes an inner surface 30a, 30b, 32a, 32b and an outer surface 34a, 34b, 36a, 36b. The bearing face 30a, 30b, 32a, 32b is a rectangular projection on the shaft 22. The central area of the outer surfaces 34a, 34b, 36a, 36b has a raised region 38a, 38b, 40a, 40b with a crowned surface 42a, 42b, 44a, 44b. Although only one surface of each pad is depicted in FIG. 2, in the first implementation of the first embodiment pad 26a is substantially identical to pad 26b and pad 28a is substantially identical to pad 28b.

The inner surfaces 30a, 30b, 32a, 32b of the pads 26a, 26b, 28a, 28b are provided with a plurality of shallow recesses 46. Preferably, the recesses 46 are formed in a pattern, such as a substantially circular pattern. The recesses 46 are connected to conduits or orifices 48 (shown, with exaggerated size, in FIG. 1) for conveying the bearing fluid to the recesses 46. In one aspect, the diameter of the orifice is approximately 0.015 inches (0.381 millimeters). In the depicted first implementation of the first embodiment, the conduits 48 are connected to an opening 50 in the raised portion 38a, 38b, 40a, 40b of the pads. The pads are supported by pressure fed through the opening 50 in the crowned portion 42a, 42b, 44a, 44b on the outside of the pads. At least one pad and preferably all pads 26a, 26b, 28a, 28b are free to move in a direction radially towards the shaft 22. In the first implementation of the first embodiment, the raised portions 38a, 38b, 40a, 40b are substantially cylindrically shaped and are positioned within cylindrically shaped recesses 52a, 52b, 54a, 54b formed in the housing 56. The pads 26a, 26b, 28a, 28b are provided with devices for creating a force on the pads in a direction towards the center of the shaft 22, as indicated in FIG. 1 by arrows 58a, 58b, 60a, 60b. In the depicted first implementation of the first embodiment, the force 58a, 58b, 60a, 60b is produced by pressurizing a piston region 62a, 62b, 64a, 64b between the pads 26a, 26b, 28a, 28b and the housing 56. The piston region is defined by portions of the pads 26a, 26b, 28a, 28b and housing 56 and by seals 66a, 66b, 68a, 68b. In the depicted first implementation of the first embodiment, annular V-seals are used. When the piston regions 62a, 62b, 64a, 64b are pressurized, the force provided to the pads is a function of the pressure in the piston region and the area of the pads exposed to the pressure. In the depicted embodiment, the seals 66a, 66b for the upper piston areas are larger than the seals 68a, 68b for the lower piston areas and thus the area of the upper pads 70 exposed to the pressure is larger than the area 72 of the lower pads exposed to the pressure. For this reason, when the four pistons 62a, 62b, 64a, 64b are equally pressurized, the force on the upper pads 58a, 58b will be greater than the force on the lower pads 60a, 60b, resulting in a net downward force 72. As depicted in FIG. 1, the difference in force between the upper pads and lower pads is sufficient that, during operation, the upper pads will be spaced a distance 74 from the housing 56 while the crowned surface of the lower pads 44a, 44b will have no spacing 76 from the housing 56 and thus will bottom on the recess region 54a, 54b. Because only two pads are bottomed at any time, tolerance problems are avoided. The net force 72 applied by the pads 26a, 26b, 28a, 28b to the shaft 22 causes the pads, for a given pressurization of the piston regions 62a, 62b, 64a, 64b, to operate at a predetermined clearance 24a, 24b and pressure ratio, (e.g., 0.3). Although some amount of variation in the clearance during operation will be expected due to such factors as imperfections in roundness of the shaft, non-symmetric loads on the shaft and delay in response time at the bearing system, nevertheless the clearance in the preferred embodiment will be substantially constant during operation, i.e., the clearance will be sufficiently constant to achieve the goals of high stiffness and high load capacity. In one aspect, clearance is maintained substantially constant at 0.0015 inches (0.0381 mm), with variation typically not exceeding approximately ±0.0001 inches (0.0025 mm). The pads will track the shaft 22 at this clearance, and will self-adjust radially to accommodate radial shaft movement or departures from a perfectly cylindrical surface as described more fully below. The self-adjusting radial clearance occurs between the pad crown and the top of the piston cylinder 74.

In the depicted first implementation of the first embodiment, the device is also provided to provide some amount of preload on the shaft 22 even when the piston areas 62a, 62b, 64a, 64b are substantially unpressurized. In this first implementation of the first embodiment, the seals 66a, 66b, 68a, 68b have an amount of resiliency or spring force which provides a spring preload to eliminate looseness when the bearing is not pressurized.

In the depicted first implementation of the first embodiment, the orifices 48 provide fluid communication between the recesses 46 and the piston region 62a, 62b, 64a, 64b. Thus, the same fluid which is used to create the fluid bearing is also used to pressurize the piston regions. In one aspect, the bearing and rotor system forms part of a turbo pump and pump discharge is used as a source of fluid for pressurizing the pistons and forming the fluid bearing. Thus, the flow to the bearing through the piston is at the supplied pressure.

Misalignment can adversely affect stiffness and damping properties, affecting rotor dynamic performance and thus it is desirable to eliminate misalignment or to provide self-aligning features. According to the first embodiment of the present invention, self-aligning of the bearing pads includes providing pads which are pivotally mounted. Preferably, the pads are free to rotate about a point, i.e., to rotate about any of an infinite number of rotations axes. In the depicted embodiment, mounting so as to permit pivoting involves a number of features. The raised areas 38a, 38b, 40a, 40b have an outer surface which is crowned or convexly curved. The convex curvature in the upper pads, combined with the size of the recesses 52a, 52b permits the upper pads 26a, 26b to pivot without hitting the housing 56. The convex crowned portion of the lower pads permits the lower pads 28a, 28b to pivot by rocking against the bottom region of the recesses 54a, 54b, when the lower pads 28a, 28b are bottomed, as described above.

In order for the pads 26a, 26b, 28a, 28b to pivot in response to angular misalignment of the shaft 22, an angular restoring force or restoring moment must be imparted to the bearing pads in response to an angular misalignment of the shaft 22. In the depicted first implementation of the first embodiment, the restoring force is provided in the following manner.

The individual pressure recesses 46 are fed by separate flow compensators 48 from the piston regions 62a, 62b, 64a, 64b. The pressure on the recesses 46 is controlled by two flow restrictions in series. The first flow restriction is in the fixed orifices 48. The second flow restrictor is the exit flow through the gap or clearance 24a, 24b between the bearing face 30a, 30b, 32a, 32b and the shaft 22. As this clearance is changed, the pressure distribution on the face of the bearing adjusts until the sum of the pressure area forces in the bearing film balances the piston pressure area force and spring force, if any. The clearance at equilibrium condition is controlled by the design of the flow restrictors or orifices 48 and the geometry of the positioning of the recesses 46. A variety of geometries is possible. Preferably, to provide the angular restoring forces, the recesses are placed in a pattern surrounding the central high pressure zone 47. Because each recess may compensate individually for local gap variations, as they are displaced from the bearing pad centerline axis, a restoring moment is imparted to the bearing pad. This moment causes the pad to pivot as described above until the moment equilibrium is achieved.

The described self-aligning feature allows much closer operation of the bearing compared to non-aligning hydrostatic systems, which, in turn, results in very high stiffness. Thus, the pads are able to achieve self-alignment in a hydrostatic system and do not require the pads to tilt in order to generate pressure, as is required in a hydrodynamic system with pivoted pad bearings.

The self-aligning feature provides consistent high load capacity such as $F_R$ as great as 10,000 pounds (4540 Kg).

In one aspect, the shaft diameter is approximately 3.5 inches (88.9 millimeters) and rotates, during operating conditions, at approximately 24,000 rpm. In one aspect, the bearing diameter is approximately 4.5 inches (114.3 millimeters) and the bearing length is approximately 2.2 inches (about 56 millimeters). The hydraulic preload on each bearing pad achieves force of approximately 4,000 pounds in response to a supply pressure of 2870 PSI (about 19788 kPa). The spherical pivot provides self-alignment misalignment capability of approximately 0.003 inches per inch. By providing four pivoting pads, the resultant radial preload 72 in this embodiment is approximately 5,600 pounds. Clearance in this aspect is approximately 0.0015 inches (about 0.0381 millimeters).

Figure 3:
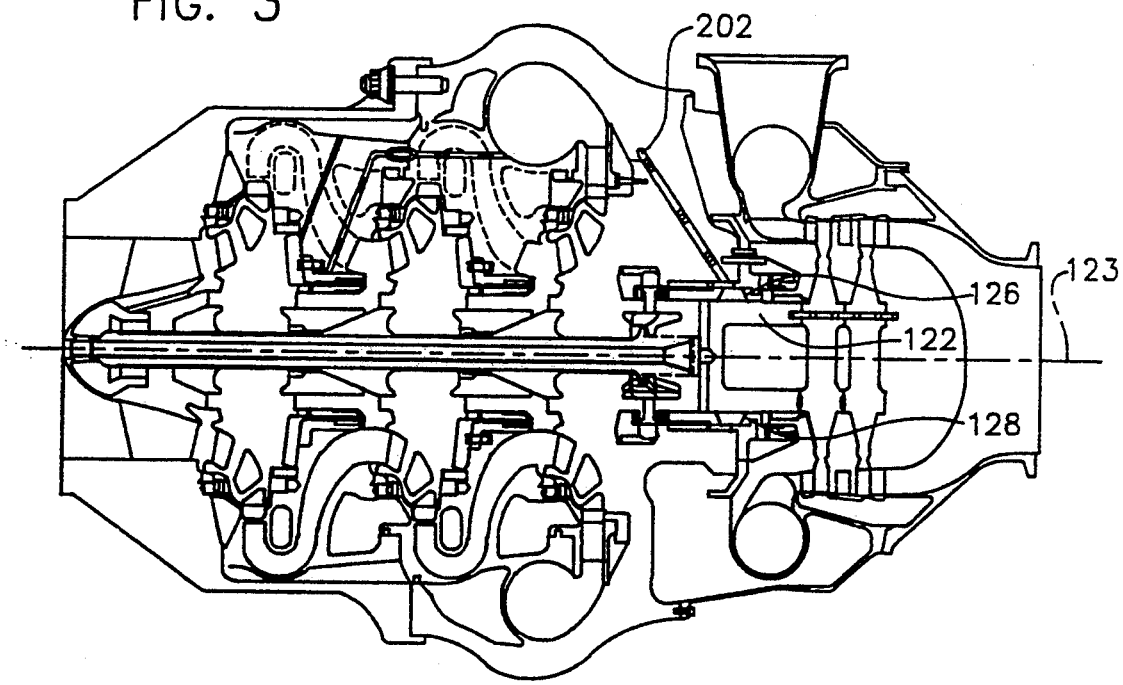
FIG. 3 is a schematic cross sectional view of a liquid hydrogen turbo pump employing the rotor bearing system according to one embodiment of the present invention.
Figure 4:
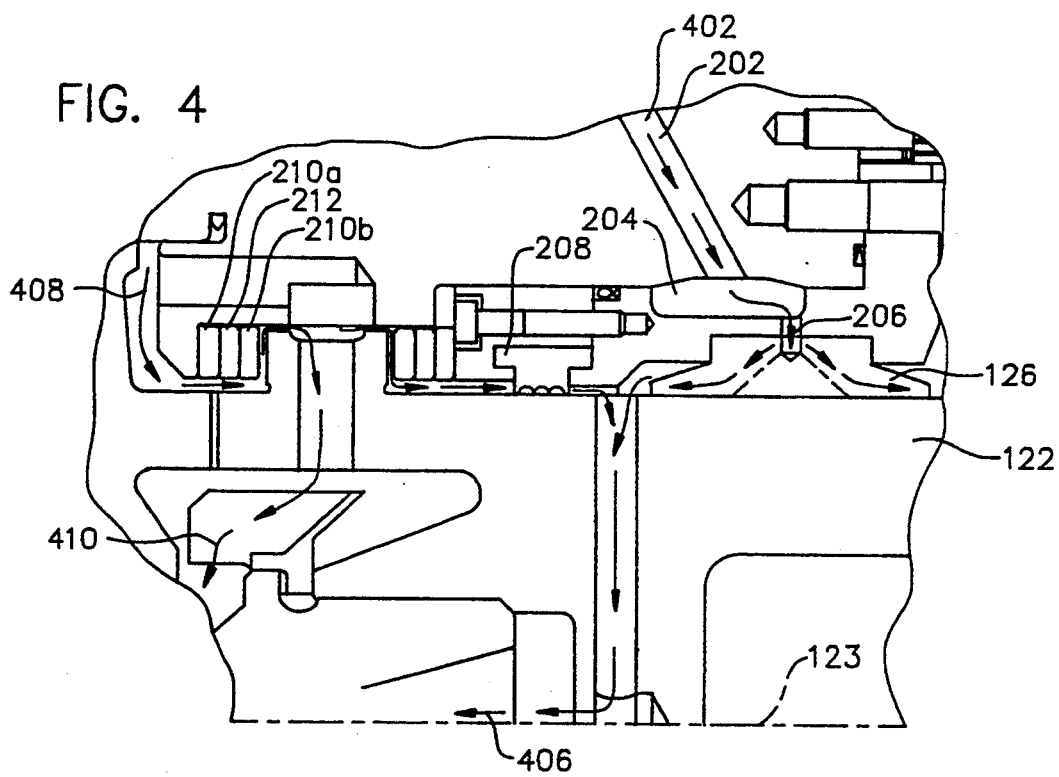
FIG. 4 is a partial cross sectional view showing the details of bearing pad according to the embodiment depicted in FIG. 3.

In operation, the described pivoted pads can be used as journal bearings for a pump device such as a second embodiment depicted in FIG. 3. The pivoting pads 126, 128 receive pump discharge from a conduit 202, reservoir 204 and second conduit 206, as seen in FIG. 4. The shaft 122 rotates about longitudinal axis 123. A ring journal seal 208 controls flow rate and reduces pressure in the bearing cavity axial thrust bearing system. A thrust washer system consists of two thrust rings 210a, 210b and an axial thrust washer 212. The three rings are stationary in steady-state operation. During start or stop transients, the shaft moves axially under load to contact the thrust ring.

FIG. 4 also includes arrows depicting the flow direction through the depicted portion of the pump. The turbine end bearing supply 402 is received from the pump discharge. After travelling through conduit 206, a portion of the flow forms the bearing and shaft seal return flow 406. The thrust balancer exit flow 408, after travelling past the thrust rings and thrust washer 210, 212, forms a portion of the thrust balancer return flow.

Figure 5:
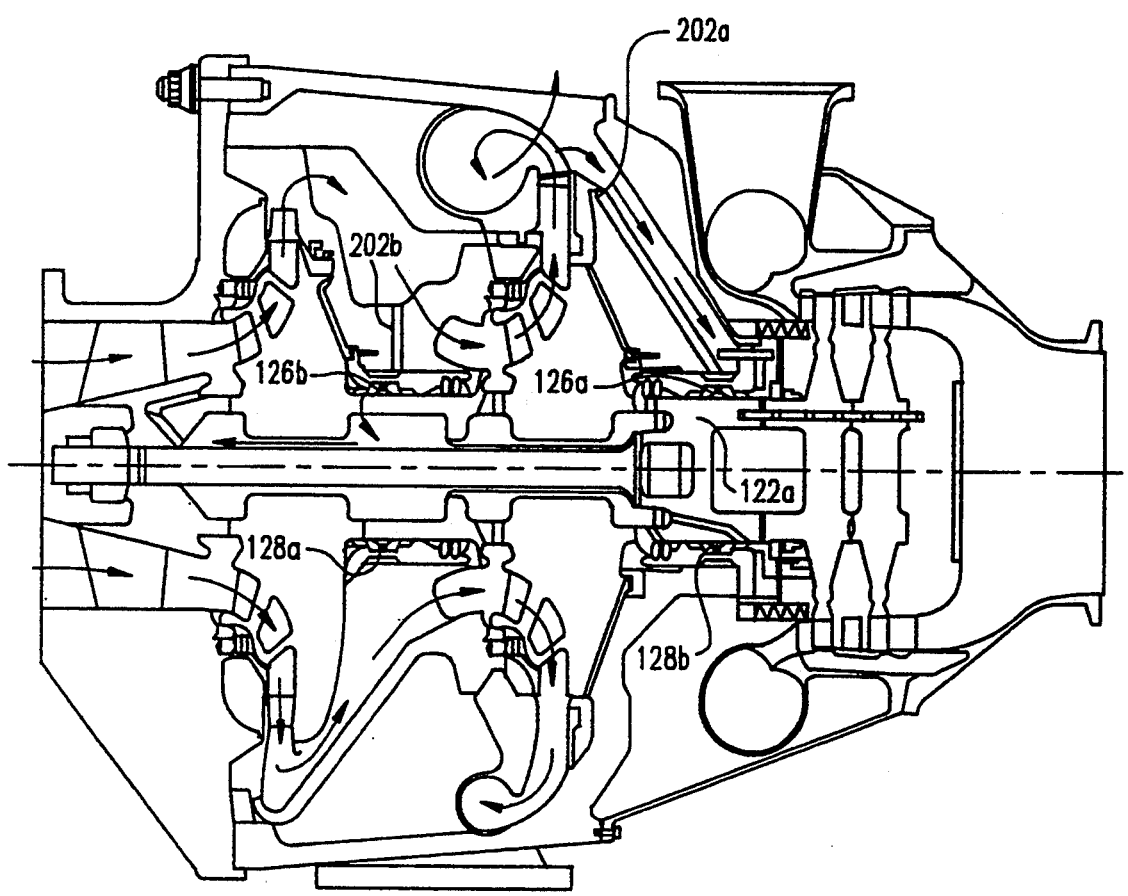
FIG. 5 is a schematic cross sectional view of a liquid hydrogen turbo pump using a rotor bearing system according to one embodiment of the present invention.

A third embodiment of a turbo pump employing the present invention is shown in FIG. 5. In the third embodiment, pivoted pads 126a, 126b, 128a, 128b act as journal bearings for a shaft 122a. Fluid is provided through conduits 202a, 202b from the pump discharge, after filtering. Similarly to the previously-described second embodiment, this pump includes the ring seal 208a, thrust rings 210C, 210D and thrust 212a.

Figure 6:
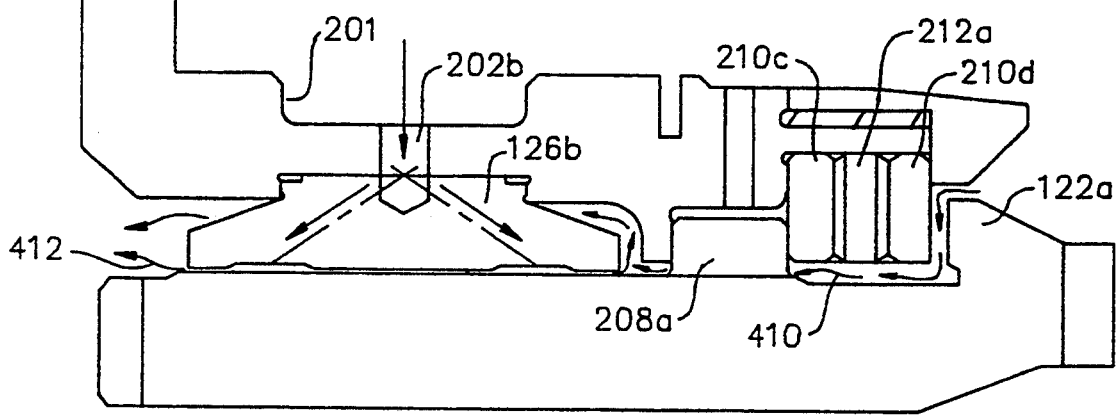
FIG. 6 is a partial cross section view showing a bearing pad and a portion of a rotor according to the embodiment depicted in FIG. 5.

Portions of the flow direction are depicted in FIGS. 5B and 6 by arrows. Flow from the bearing supply annulus 201 travels through conduit 202b and is joined by a portion of the shaft seal return 410 from the impeller inlet to eventually provide the bearing exit flow 412.

The bearing pads and shaft can be made from a number of materials. In one aspect, the bearing pad 126b is made of phosphor bronze and the shaft 122a is made from INCO 718.

The present invention provides high load capacity and high stiffness. The high values of load capacity and stiffness are derived from hydrostatic action of the external pressure fed to the bearing as it passes through the bearing film. The present invention also provides for relatively low cross-coupled stiffness. A low cross-coupled stiffness is desirable since cross-coupled stiffness is a major whirl driver for super critical turbo pumps. The above-described self-aligning feature substantially eliminates bearing cross-coupling coefficient values.

It is also possible to offset the pistons tangentially relative to the bearing face, either forward or backward (relative to the direction of rotation 23a). In this way, a non-negligible cross-coupling coefficient can be generated. Although it is generally believed desirable to eliminate cross-coupling in the types of devices described above, cross-coupling can be intentionally generated in order to counteract other forward or backward whirl drivers (such as those arising from impellers, turbines, seals and the like) which act on the rotor.

The amount of misalignment tolerated can be adjusted by adjusting the radius of the convexed portion of the pad crowns. Particularly with regard to the pads which are bottomed, the pad can be radiused to provide the desired misalignment angle. Further, the bottom of the cylinder can be flat, as depicted in FIG. 1, or radiused, e.g. to conform to the pad crown. Conformity to the pad crown, at least to some extent provides for greater accommodation of contact stress. Thus, the radius of the crown and the radius of the bottom of the recess can be adjusted to provide the desired balance between contact stress, contact stiffness and misalignment capability. Contact stiffness, in turn, can be adjusted in order to control overall bearing stiffness, e.g. for tuning a super critical design. Stiffness is also related to bearing pad and recess or cylinder material. Hard on hard material combinations will have the highest stiffness.

Preferably, the pivot point is located close to the bearing surface in order to minimize tangential pivoting moment caused by fluid friction of the spinning shaft.

The seal 66a, 66b, 68a, 68b can be designed in order to provide external coulomb damping. For example, by using an O-ring or piston ring seal, the friction force of the seal with the recess or cylinder will provide external damping.

The central shallow high pressure zone 47 minimizes recess volume. Minimizing the recess volume is desirable in order to maintain pneumatic stability with compressible fluids such as air, gaseous nitrogen or hydrogen or liquid hydrogen.

Figure 7:
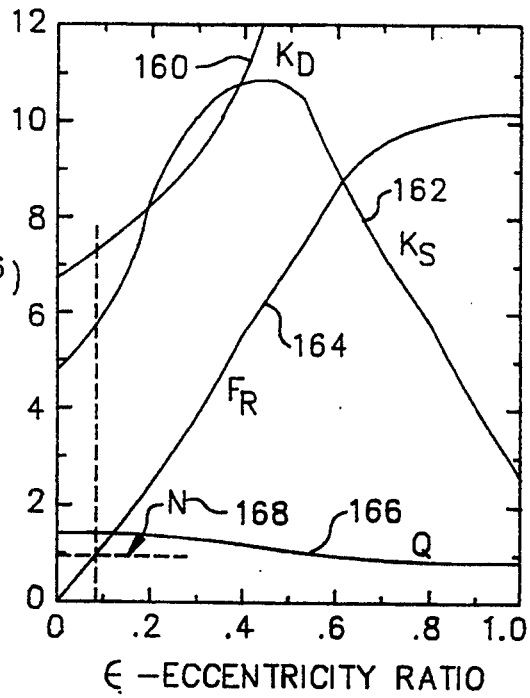
FIG. 7 is a graph depicting the relationship of dynamic stiffness ($K_D$), bearing radial stiffness ($K_S$), bearing radial capacity ($F_R$) and flow rate (Q) for various values of eccentricity ratio (E) for a bearing rotor system according to an embodiment of the present invention.

FIG. 7 depicts the relationship of various performance parameters to the eccentricity ratio of (e/c) radial deflection e divided by nominal operating clearance c, in a device formed according to the present invention. In FIG. 7, $K_D$ 160 indicates dynamic stiffness of the bearing (in pounds per inch times $10^{-7}$). $K_S$ 162 shows bearing radial stiffness (in pounds per inch times $10^{-6}$). $F_R$ 164 indicates bearing radial load (in pounds times $10^{-3}$). Q 166 indicates the bearing fluid flow rate (in gallons per minute times $10^{-2}$). N 168 indicates the nominal load condition for the bearing. In the device indicated, capacity is approximately ten times the applied load. Thus, for the device of the present invention having characteristics depicted in FIG. 7, the load capacity and stiffness are both significantly improved over corresponding previous bearings such as ball bearings. The device is substantially free from speed limits on the bearing.

Figure 8:
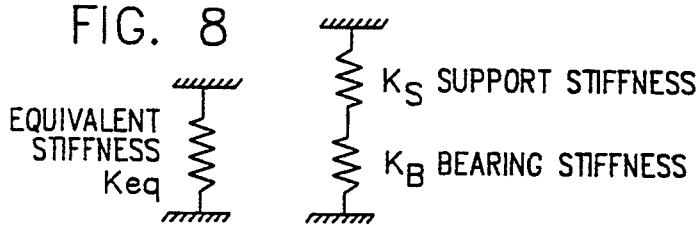
FIG. 8 is a graph depicting equivalent radial stiffness ($K_{EQ}$) versus bearing radial stiffness ($K_B$) for various values of support stiffness ($K_S$) and including a bearing operating range according to one embodiment of the present invention.
Figure 8:
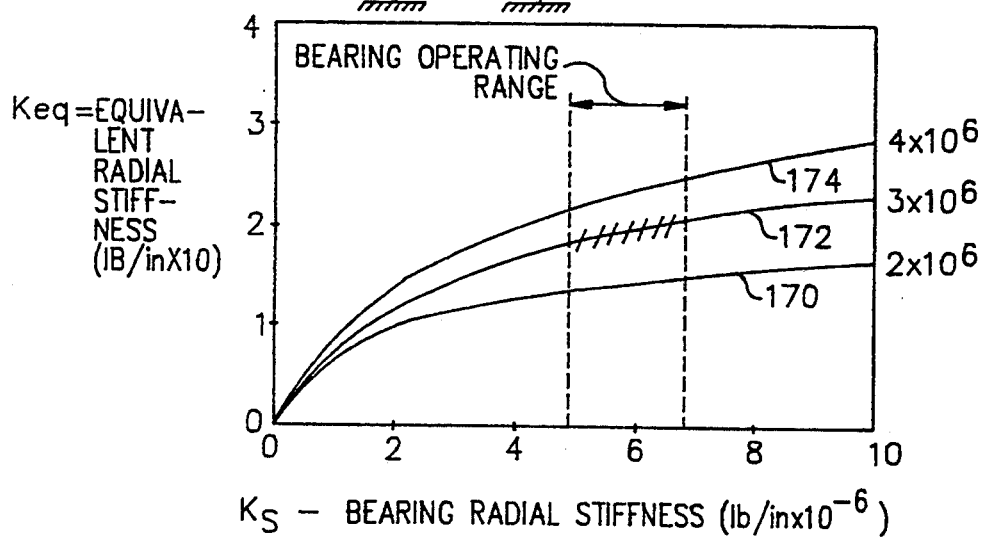

FIG. 8 depicts the value of equivalent radial stiffness ($K_{EQ}$ in pounds per inch times 10) versus radial bearing stiffness ($K_S$ in pounds per inch times $10^{-6}$). Equivalent radial stiffness is the stiffness of an elastic system, such as a spring system, which would be equivalent to two series-connected elastic systems, such as spring systems, having the stiffness of $K_S$ and $K_B$, respectively. $K_S$ is support stiffness in pounds per inch. Three curves 170, 172, 174 are shown in FIG. 8 for three values of support stiffness, viz. $2 \times 10^6$, $3 \times 10^6$ and $4 \times 10^6$. By making the fluid stiffness high and selecting the support to achieve stiffness desired for rotor dynamics, predictable stiffness can be provided for controlling the super critical rotor design. The bearing operating range, in one embodiment, is a range of approximately 5 to $7 \times 10^{-6}$ pounds per inch. In this operating range, and with a support stiffness of $3 \times 10^6$ pounds per inch, the equivalent stiffness is in a range of 1.2 to $2 \times 10^6$ pounds per inch. Moreover, equivalent stiffness for these conditions is on the flat part of the curve. Thus, a bearing produced according to the present invention can achieve substantial isostiffness characteristics.

The flat stiffness curve shown in FIG. 8 provides accurate critical speed control high loads such as 22,500 pounds, 10,215 kg, for a 4.5 inch diameter journal bearing and 40,000 pounds, 18,160 kg, for a 7.0 inch diameter thrust bearing. High pressures such as 4050 pounds per square inch, 27,923 kPa, high speeds such as 60,000 rpm to 75,000 rpm or more, and long life such as 1,100 hours or more.

Figure 9:
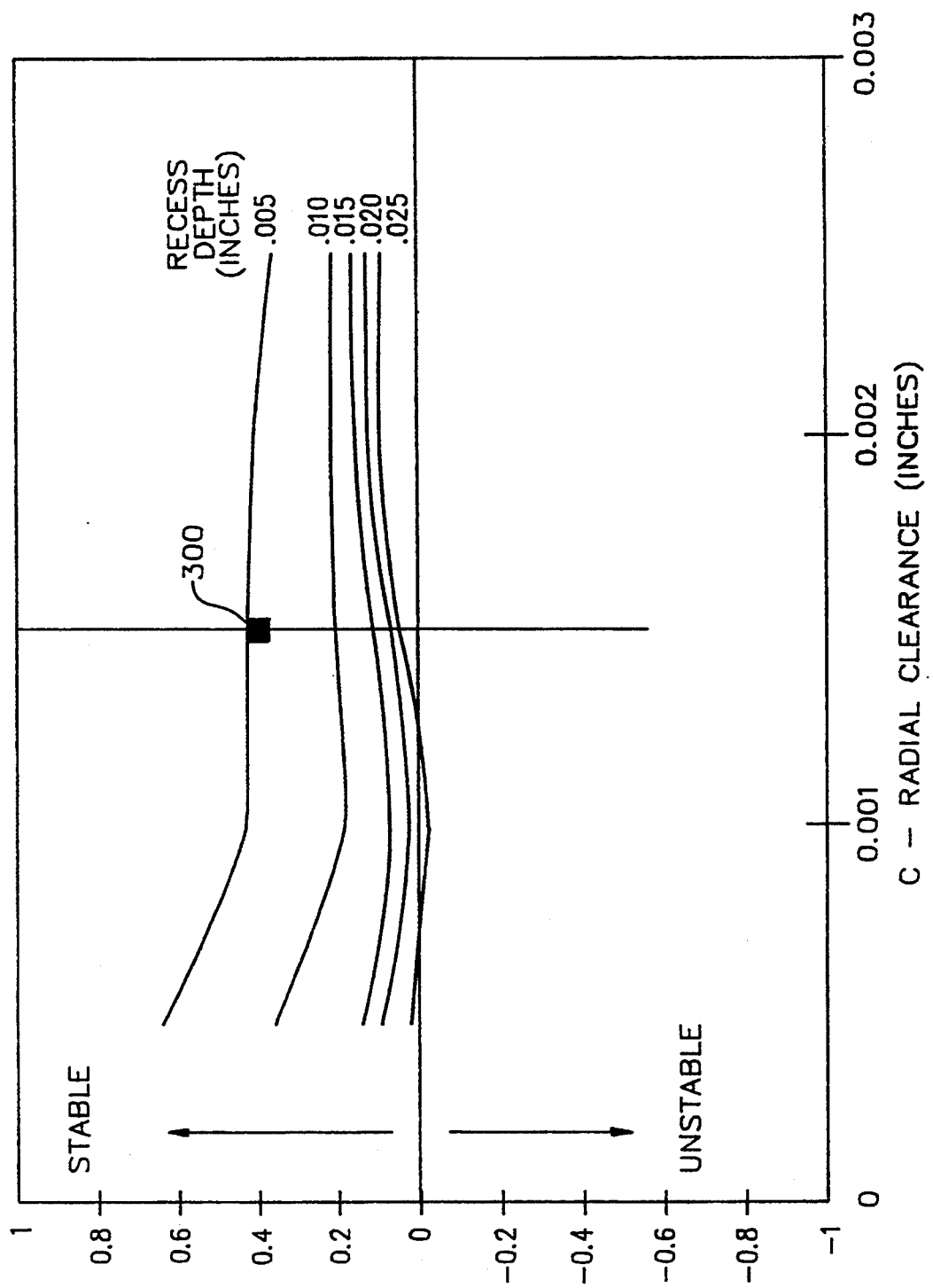
FIG. 9 depicts pneumatic stability vs. radial clearance (C) for various values of bearing pad recess depth including the stability of a device according to one embodiment of the present invention.

According to one aspect of the invention, the bearing fluid is a slightly compressible fluid such as liquid hydrogen. With such a fluid, self-excited pneumatic stability is a possibility. FIG. 9 depicts a stability perimeter as a function of clearance for several values of recess depth. The effective recess volume of the pivoted pad 300 according to one embodiment of the invention provides low recess volume resulting in a large stability margin.

The stability curves shown in FIG. 9, (values times $10^7$) are obtained from the following relationship:

$$\frac{\left(\frac{\partial M}{\partial h}\right)}{\left(\frac{\partial M}{\partial P}\right)} \tag{1}$$

Where:
M is fluid mass within recess volume (lb)
h is bearing clearance (in)
P is fluid compressibility bulk modulus (lb/in$^2$)

The stability criteria for the regions designated in FIG. 9 as "stable" and "unstable" is shown by the following relationship:

$$\frac{\left(\frac{\partial M}{\partial h}\right)}{\left(\frac{\partial M}{\partial P}\right)} > \frac{\left(\frac{\partial (\dot{w}_o - \dot{w}_i)}{\partial h}\right)}{\left(\frac{\partial (\dot{w}_o - \dot{w}_i)}{\partial P}\right)} \tag{2}$$

Where:
$w_o$ is weight rate of flow out of bearing (lb/sec)
$w_i$ is weight rate of flow into bearing (lb/sec)

The curves in FIG. 9 are obtained by parametric analysis, assuming the fluid is liquid hydrogen at 60° R, the pad length and pad width is 2 inches (50.8 millimeters).

Figure 10:
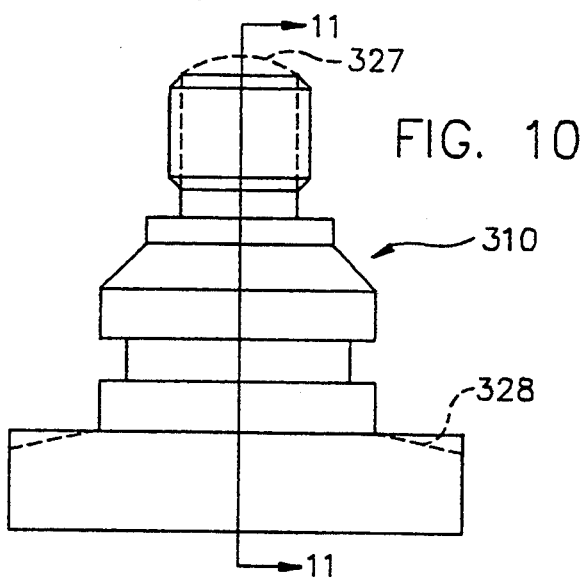
FIG. 10 is a elevational view of a rotor pad according to one embodiment of the present invention.
Figure 11:
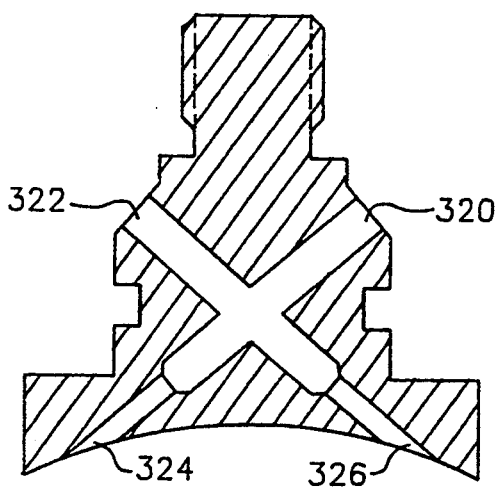
FIG. 11 is a cross sectional view taken along line 11—11 of FIG. 10.

FIG. 10 depicts a fourth embodiment of the present invention. As seen in FIG. 11, orifices 320, 322 provide for flow of the bearing fluid to a plurality of shallow recesses 324, 326 in the bottom surface of the bearing pad.

Figure 12:
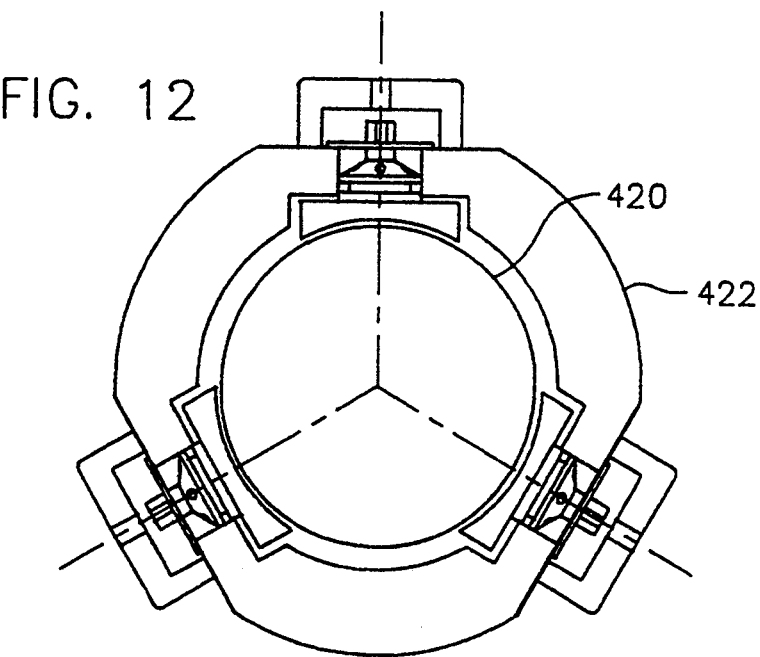
FIG. 12 is an end view of a shaft and bearings according to one embodiment of the present invention.
Figure 13:
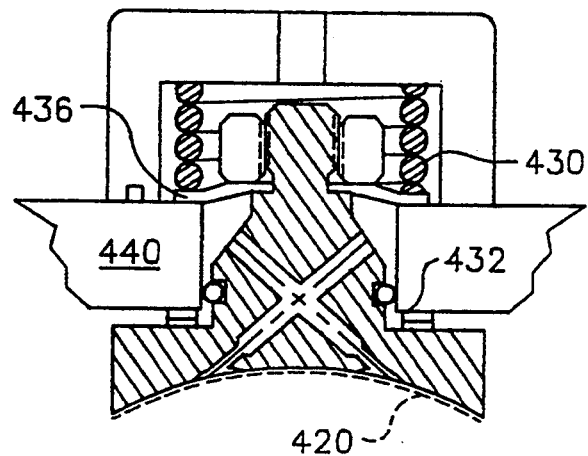
FIG. 13 is a partial cross-sectional view of a bearing pad and housing showing springs according to an embodiment of the present invention.
Figure 14:
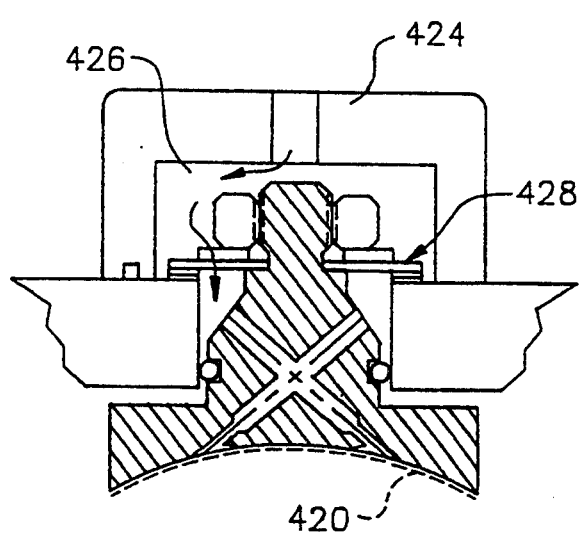
FIG. 14 is a partial corss-sectional view showing a bearing pad and a cover forming a supply cavity according to an embodiment of the present invention.

FIG. 12 depicts the bearing of FIGS. 10 and 11 in a first implementation of the fourth embodiment in connection with a journal bearing design to form bearings for a rotor 420 housed in a frame 422. In a second implementation of the fourth embodiment depicted in FIG. 14, a cover 424 forms a supply cavity 426. In a third implementation of the fourth embodiment, suspension using a retraction spring and/or upper and lower springs 430, 432, as depicted in FIG. 13, can be used to permit some amount of pivoting for the purposes described below. A stop member 436 acting against a frame cylinder 440 can be provided. in a fourth implementation of the fourth embodiment, the head region 327 or shoulder region 328 can be crowned to facilitate pivoting.

In view of the above description, a number of advantages of the present invention can be seen. The bearing of the present invention is self-adjusting and self-aligning to accommodate the deflections and misalignments of devices such as cryogenic turbo pumps. The self-aligning feature minimizes the cross-coupled stiffness and provides a stable rotor motion. Self-aligning and self-adjusting features allow closer operating clearances which magnify the damping characteristics of the bearing. The radial preload to the bearing system promotes stable rotor motion. Piston spring preload eliminates radial play from the bearing system preventing relative motion during transportation and storage.

The hydrostatic rotor bearing, particularly when operating on liquid hydrogen from pump discharge, provides a load capacity an order of magnitude higher than rolling element bearings. In one aspect, the turbo pump provides a load in the range of 500 to 1200 pounds for pumping liquid hydrogen and approximately 22,000 pounds for pumping water. A bearing provides virtually unlimited life and imposes no significant shaft speed or diameter limits. Stiffness can be controlled to desired values with significant damping.

By providing a pivoted pad hydrostatic journal bearing according to the present invention, individual pads self-adjust to accommodate housing and shaft dimension changes.

A number of variations and modifications of the present invention can also be used. Although the invention has been described in connection with turbo pumps such as cryogenic turbo pumps, e.g. for pumping low viscosity fluids such as liquid hydrogen, applications for the present invention include most rotating machines including pump, compressors, gas turbines and are particularly useful where low viscosity fluids might be used in large machines for high pressure. It is possible to use some aspects of the present invention without using other aspects. For example, the pivoting feature can be used without the non-pressurized spring preload. It is possible to provide the bearing fluid to the lower surface of the pad other than directly from the pressurized piston region. It is possible to provide a spring preload using a device separate from the piston wall. The load to the pads during operation can be provided by systems other than hydrostatic pressure such as mechanical spring pressure. Other types of seals can be provided in addition to the V-seals such as O-ring seals, piston ring seals, close clearance seals, bellows and the like. Other types of preload springs are possible, including coil springs and wave springs. More or fewer pivoting pads than those depicted in the figures can be used.

Although the present invention has been described by way of a preferred embodiment and certain variations and modifications, other variations and modifications can also be used, the invention being defined by the following claims.

What is claimed is:

1. Hydrostatic journal bearing apparatus usable for rotatably mounting a shaft within a housing, comprising:
   at least first and second bearing pads, each having at least a first surface spaced a first clearance distance from said shaft and a second surface, each of said first and second bearing pads positioned between a portion of said shaft and said housing, each of said first and second bearing pads having at least one conduit for delivering a bearing fluid to a region adjacent said first surface;
   said first and second bearing pads being mounted to permit pivoting of each of said first and second bearing pads with respect to said housing;
   at least one of said first and second bearing pads mounted to permit movement in a substantially radial direction;
   wherein a pressurizable piston region couples at least said one of said first and second bearing pads to said housing and wherein pressurization of said piston region creates a force on said bearing pad in a direction toward said shaft; and
   a spring mounted to urge said at least one of said first and second bearing pads towards said shaft when said piston region is substantially unpressurized.

2. Apparatus, as claimed in claim 1, wherein said first and second bearing pads are mounted to permit pivoting of at least one of said first and second bearing pads with respect to at least two axes.

3. Apparatus, as claimed in claim 1, wherein said second surface is substantially in the shape of a spherical surface.

4. Apparatus, as claimed in claim 3, wherein said spherical surface of at least one of said bearing pads contacts a first surface of said housing.

5. Apparatus, as claimed in claim 1, wherein said first surface of said housing is substantially planar.

6. Apparatus, as claimed in claim 1, wherein said pressurizable piston region contains a pressurized fluid.

7. Apparatus, as claimed in claim 1, wherein said conduit provides fluid communication between said pressurizable piston region and said clearance region.

8. Apparatus, as claimed in claim 1, wherein said pressurizable piston region is at least partially defined by a seal extending between said bearing pad and said housing.

9. Apparatus, as claimed in claim 8, wherein said seal includes a spring which produces a force towards said shaft.

10. Apparatus, as claimed in claim 9, wherein said fluid in said pressurizable piston region is in fluid communication with said bearing fluid.

11. Apparatus, as claimed in claim 1, further comprising:
    a second pressurizable piston region coupling said second bearing pad to said housing.

12. Apparatus, as claimed in claim 1,
    wherein said clearance is less than about 0.002 in. and variation is said clearance during operation is less than about 0.001 in.

13. Hydrostatic journal bearing apparatus usable for rotatably mounting a shaft within a housing, comprising:
    at least first and second bearing pads, each having at least a first surface spaced a first clearance distance from said shaft and a second surface, each of said first and second bearing pads positioned between a portion of said shaft and said housing, each of said first and second bearing pads having at least one conduit for delivering a bearing fluid to a region adjacent said first surface;

said first and second bearing pads being mounted to permit pivoting of each of said first and second bearing pads with respect to said housing;

at least one of said first and second bearing pads mounted to permit movement in a substantially radial direction; and wherein said piston region is tangentially offset relative to said first surface.

14. Hydrostatic journal bearing apparatus usable for rotatably mounting a shaft within a housing, comprising:

at least first and second bearing pads, each having at least a first surface spaced a first clearance distance from said shaft and a second surface, each of said first and second bearing pads positioned between a portion of said rotor and said housing, each of said first and second bearing pads having at least one conduit for delivering a bearing fluid to a region adjacent said first surface;

said first and second bearing pads being mounted to permit pivoting of each of said first and second bearing pads with respect to said housing;

at least one of said first and second bearing pads mounted to permit movement in a substantially radial direction;

wherein each of said first surface includes a plurality of recesses in fluid communication with said conduit; and wherein the total volume of all said recesses for said first pad is less than 0.005 in$^3$.

15. Hydrostatic journal bearing apparatus usable for rotatably mounting a shaft within a housing, comprising:

at least first and second bearing pads, each having at least a first surface spaced a first clearance distance from said shaft and a second surface, each of said first and second bearing pads positioned between a portion of said shaft and said housing, each of said first and second bearing pads having at least one conduit for delivering a bearing fluid to a region adjacent said first surface;

said first and second bearing pads being mounted to permit pivoting of each of said first and second bearing pads with respect to said housing;

at least one of said first and second bearing pads mounted to permit movement in a substantially radial direction;

a second pressurizable piston region coupling said second bearing pad to said housing; and wherein the area of said first bearing pad in contact with said first pressurizable piston region is greater than the area of said second bearing pad in contact with said second pressurizable piston region.

16. Hydrostatic journal bearing apparatus usable for rotatably mounting a shaft within a housing, comprising:

at least first and second bearing pads, each having at least a first surface spaced a first clearance distance from said shaft and a second surface, each of said first and second bearing pads positioned between a portion of said shaft and said housing, each of said first and second bearing pads having at least one conduit for delivering a bearing fluid to a region adjacent said first surface;

said first and second bearing pads being mounted to permit pivoting of each of said first and second bearing pads with respect to said housing; and at least one of said first and second bearing pads mounted to permit movement in a substantially radial direction; and wherein said bearing fluid has viscosity of less than about 0.02 centipoise.

17. Hydrostatic journal bearing apparatus usable for rotatably mounting a shaft within a housing, comprising:

at least first and second bearing pads, each having at least a first surface spaced a first clearance distance from said shaft and a second surface, each of said first and second bearing pads positioned between a portion of said rotor and said housing, each of said first and second bearing pads having at least one conduit for delivering a bearing fluid to a region adjacent said first surface;

said first and second bearing pads being mounted to permit pivoting of each of said first and second bearing pads with respect to said housing;

at least one of said first and second bearing pads mounted to permit movement in a substantially radial direction; and wherein each said first surface includes a plurality of recesses in fluid communication with said conduit;

wherein a pressurizable piston region couples at least said one of said first and second bearing pads to said housing and wherein pressurization of said piston region creates a force on said bearing pad in a direction toward said shaft; and a spring mounted to urge said at least one of said first and second bearing pads towards said shaft when said piston region is substantially unpressurized.

18. Apparatus, as claimed in claim 17, wherein each recess is connected to a substantially constant area orifice.

19. Apparatus, as claimed in claim 17, wherein said plurality of recesses are positioned in a pattern substantially surrounding a high pressure region.

20. Hydrostatic journal bearing apparatus usable for rotatably mounting a shaft within a housing, comprising:

at least first and second bearing pads, each having at least a first surface spaced a first clearance distance from said shaft and a second surface, each of said first and second bearing pads positioned between a portion of said shaft and said housing, each of said first and second bearing pads having at least one conduit for delivering a bearing fluid to a region adjacent said first surface;

said first and second bearing pads being mounted to permit pivoting of each of said first and second bearing pads with respect to said housing;

at least one of said first and second bearing pads mounted to permit movement in a substantially radial direction; and wherein said bearing fluid has a bulk modulus compressibility of at least about 5000 lb./in2.

21. Hydrostatic journal bearing apparatus usable for rotatably mounting a shaft within a housing, comprising:

at least first and second bearing pads, each having at least a first surface spaced a first clearance distance from said shaft and a second surface, each of said first and second bearing pads positioned between a portion of said shaft and said housing;

at least one conduit for delivering a bearing fluid to a region adjacent said first surface;

means for mounting said first and second bearing pads to permit pivoting of each of said first and second bearing pads with respect to said housing;

pressurized piston means for mounting at least one of said first and second bearing pads to permit movement, in response to pressurization of said piston means, in a substantially radial direction, wherein said piston means includes spring means for producing a force towards said shaft in the absence of pressurization of said piston means; and means for urging said at least one bearing pad radially toward said shaft when said rotatable shaft is not rotating.

22. Apparatus, as claimed in claim 21, wherein said bearing apparatus has a stiffness of at least about $1.5 \times 10^6$ lb/in.

23. Apparatus, as claimed in claim 21, wherein said bearing apparatus has a direct stiffness of at least about $3 \times 10^6$ lb/in and a cross-coupled stiffness of less than about $2 \times 10^5$ lb/in.

24. Apparatus, as claimed in claim 21, further comprising means for providing externally coulomb damping.

25. Apparatus, as claimed in claim 24, wherein said means for providing external coulomb damping includes an O-ring.

26. Hydrostatic journal bearing apparatus usable for rotatably mounting a shaft within a housing, comprising:

at least first and second bearing pads, each having at least a first surface spaced a first clearance distance from said shaft and a second surface, each of said first and second bearing pads positioned between a portion of said shaft and said housing;

at least one conduit for delivering a bearing fluid to a region adjacent said first surface;

means for mounting said first and second bearing pads to permit pivoting of each of said first and second bearing pads with respect to said housing;

pressurized piston means for mounting at least one of said first and second bearing pads to permit movement, in response to pressurization of said piston means, in a substantially radial direction, wherein said piston means includes spring means for producing a force towards said shaft in the absence of pressurization of said piston means; and means for providing external squeeze film damping.

27. Hydrostatic journal bearing apparatus usable for rotatably mounting a shaft within a housing, comprising:

at least first and second bearing pads, each having at least a first surface spaced a first clearance distance from said shaft and a second surface, each of said first and second bearing pads positioned between a portion of said shaft and said housing;

at least one conduit for delivering a bearing fluid to a region adjacent said first surface;

means for mounting said first and second bearing pads to permit pivoting of each of said first and second bearing pads with respect to said housing;

pressurized piston means for mounting at least one of said first and second bearing pads to permit movement, in response to pressurization of said piston means, in a substantially radial direction, wherein said piston means includes spring means for producing a force towards said shaft in the absence of pressurization of said piston means; and wherein said means for providing said external coulomb damping includes a ring seal.

* * * * *